United States Patent
Bruel et al.

(10) Patent No.: US 6,339,469 B1
(45) Date of Patent: Jan. 15, 2002

(54) METHOD AND DEVICE FOR DETERMINING THE DISTRIBUTION OF INTENSITY AND PHASE IN A LASER BEAM DIFFERENT CUTTING PLANES

(75) Inventors: Laurent Bruel, Saint Paul Trois Chateaux; Jérôme Belledent, Mennecy, both of (FR)

(73) Assignee: Commissariat a l'Energie Atomique, Paris (FR)

(*) Notice: Subject to any disclaimer, the term of this patent is extended or adjusted under 35 U.S.C. 154(b) by 0 days.

(21) Appl. No.: 09/601,398

(22) PCT Filed: Feb. 11, 1999

(86) PCT No.: PCT/FR99/00307
§ 371 Date: Dec. 15, 2000
§ 102(e) Date: Dec. 15, 2000

(87) PCT Pub. No.: WO99/41576
PCT Pub. Date: Aug. 19, 1999

(30) Foreign Application Priority Data

Feb. 12, 1998 (FR) .................................. 98 01693

(51) Int. Cl.$^7$ .................................................. G01J 1/00
(52) U.S. Cl. ............................................................ 356/121
(58) Field of Search ................................. 356/121, 521, 356/218, 222; 250/201.9

(56) References Cited

U.S. PATENT DOCUMENTS 4,157,223 A * 6/1979 Skolnick .................. 356/354
6,052,180 A * 4/2000 Neal et al. ................ 356/121

OTHER PUBLICATIONS

Gerchberg & Saxton; "Phase Determination from Image and Diffraction Plane Pictures in the Electron Microscope", Jul. 1971, 6 pages.
Misell, "A Method for the Solution of the Phase Problem in Electron Microscopy", vol. 6, 4 pages.
Fienup, "Phase Retrieval Algorithms: A Comparison", vol. 21, No. 15, Aug. 1982, 12 pages.
Isernia, Leone & Pierri, "Radiation Pattern Evaluation from Near–Field Intensities on Planes", vol. 44, No. 5, May 1996, 10 pages.
Taylor, "The Phases Retrieval Problem", vol. AP–29, No. 2, Mar. 1981, 6 pages.

* cited by examiner

*Primary Examiner*—Hoa Q. Pham
(74) *Attorney, Agent, or Firm*—Burns Doane Swecker & Mathis LLP

(57) ABSTRACT

A method and device for determining the intensity and phase distribution of a coherent light beam, in a plane, including measuring the intensity Ii, i=1 . . . N, of the beam, in N planes, N≧3, having the plane wherein intensity and phase distribution is to be determined, choosing, for plane i=1, an initial phase matrix $\phi_1$ and calculating a complex amplitude matrix, by term-wise multiplying the phase matrix $e^{i\phi_1}$ by the corresponding amplitude matrix $A_1$, for each plane j>1: determining a propagated complex matrix $B'_j$ from the measured amplitude matrix $A_{j-1}$ of plane j−1 and the phase matrix $\phi$ of plane j−1, extracting, from $B'_j$, a phase matrix of plane j, and iterating the method up to convergence, with j=1 when j−1=N.

16 Claims, 4 Drawing Sheets

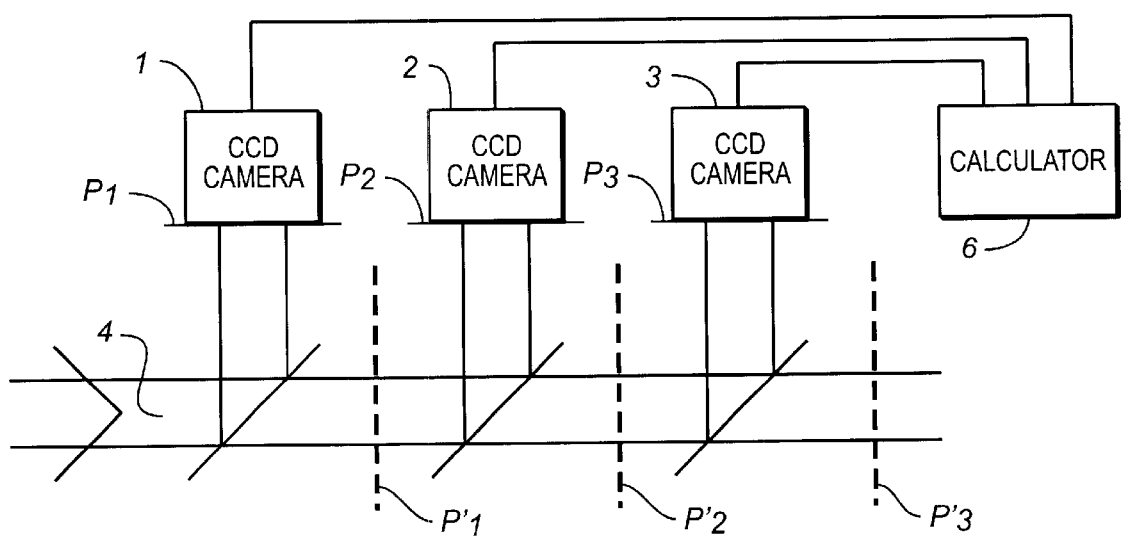
FIG._1

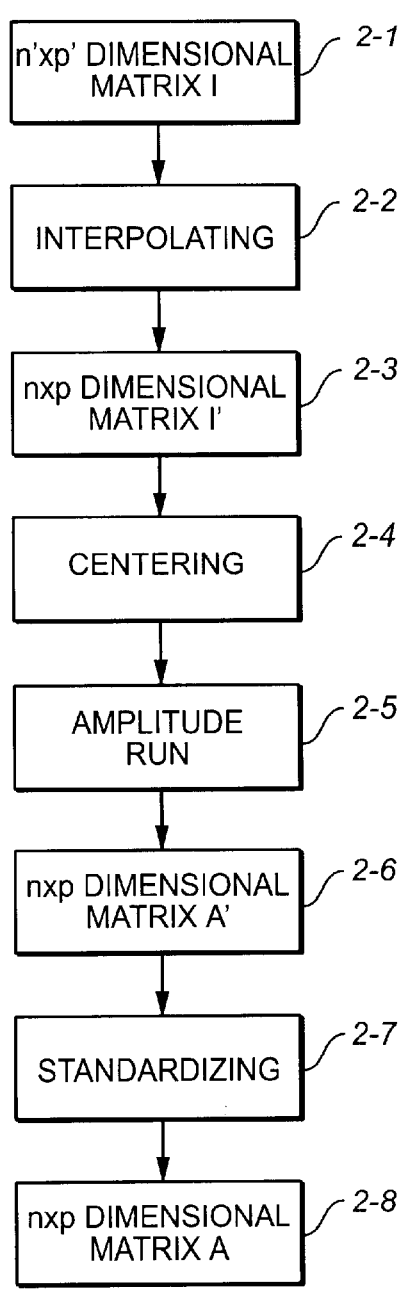
*FIG._2*
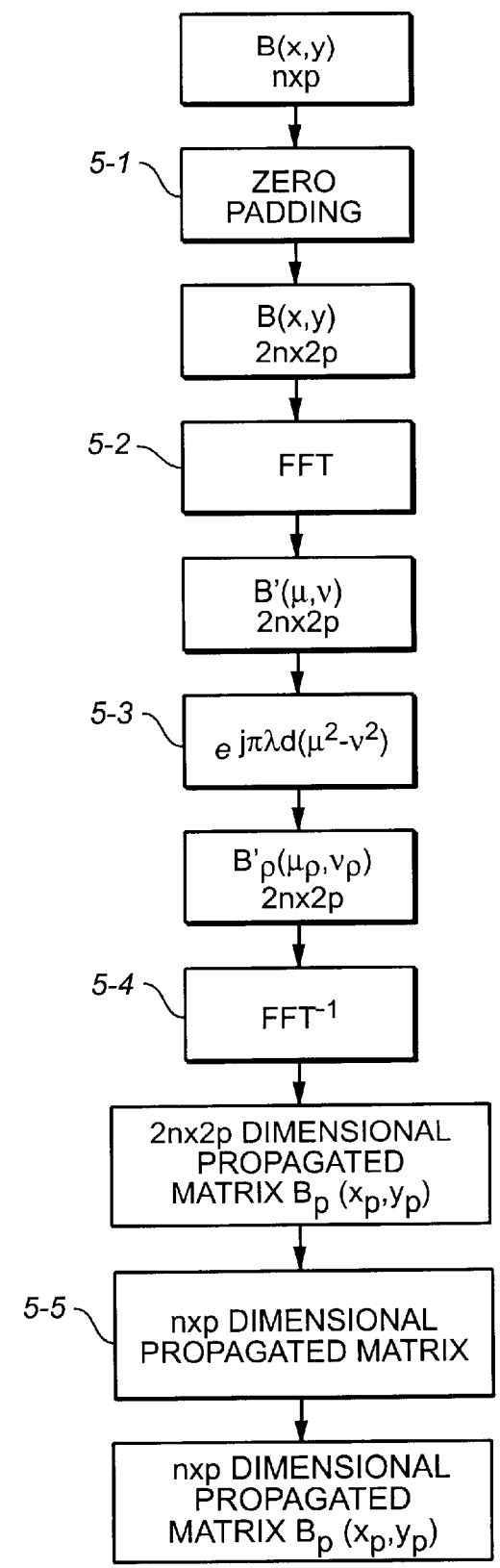
*FIG._5*

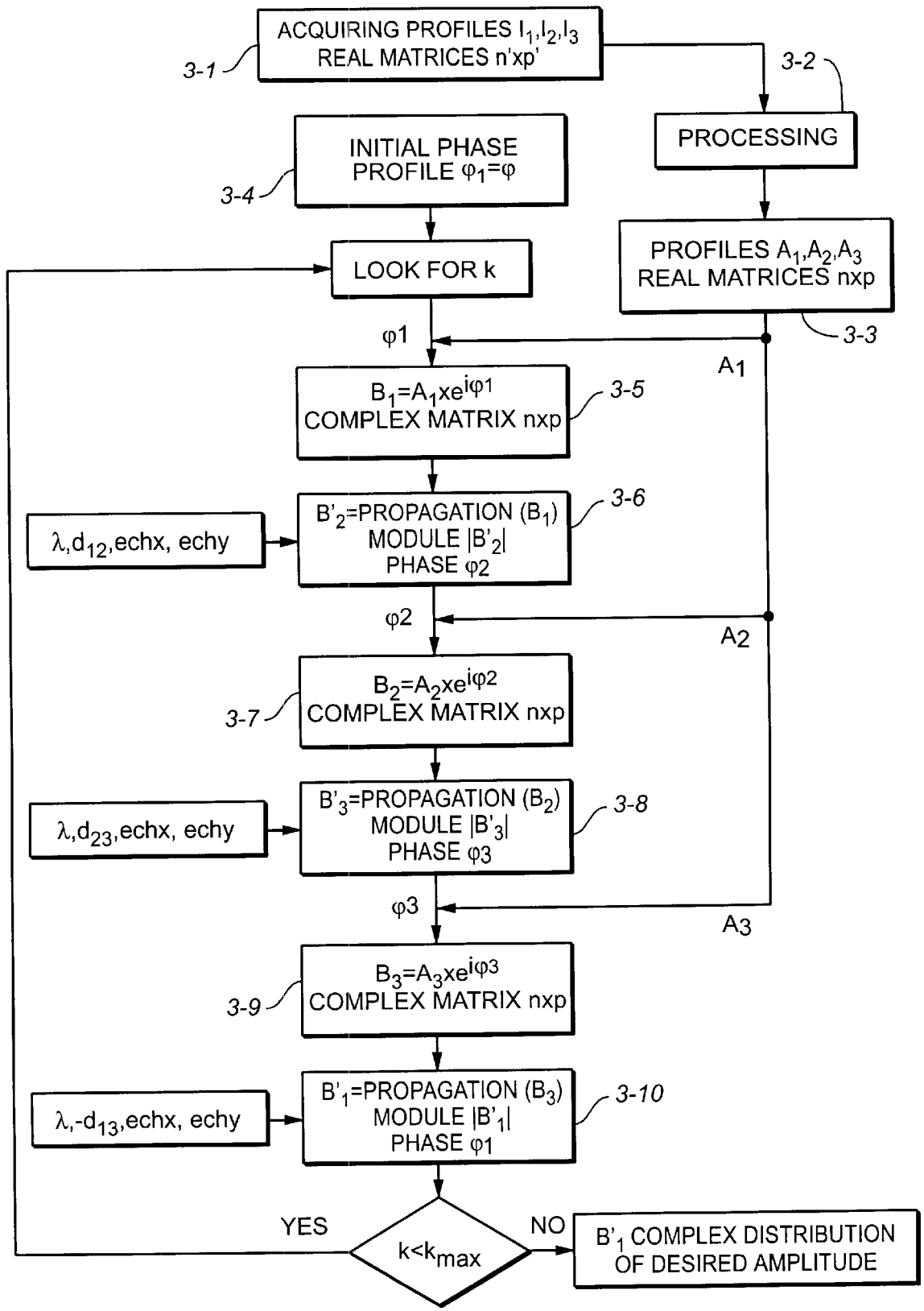
*FIG._3*

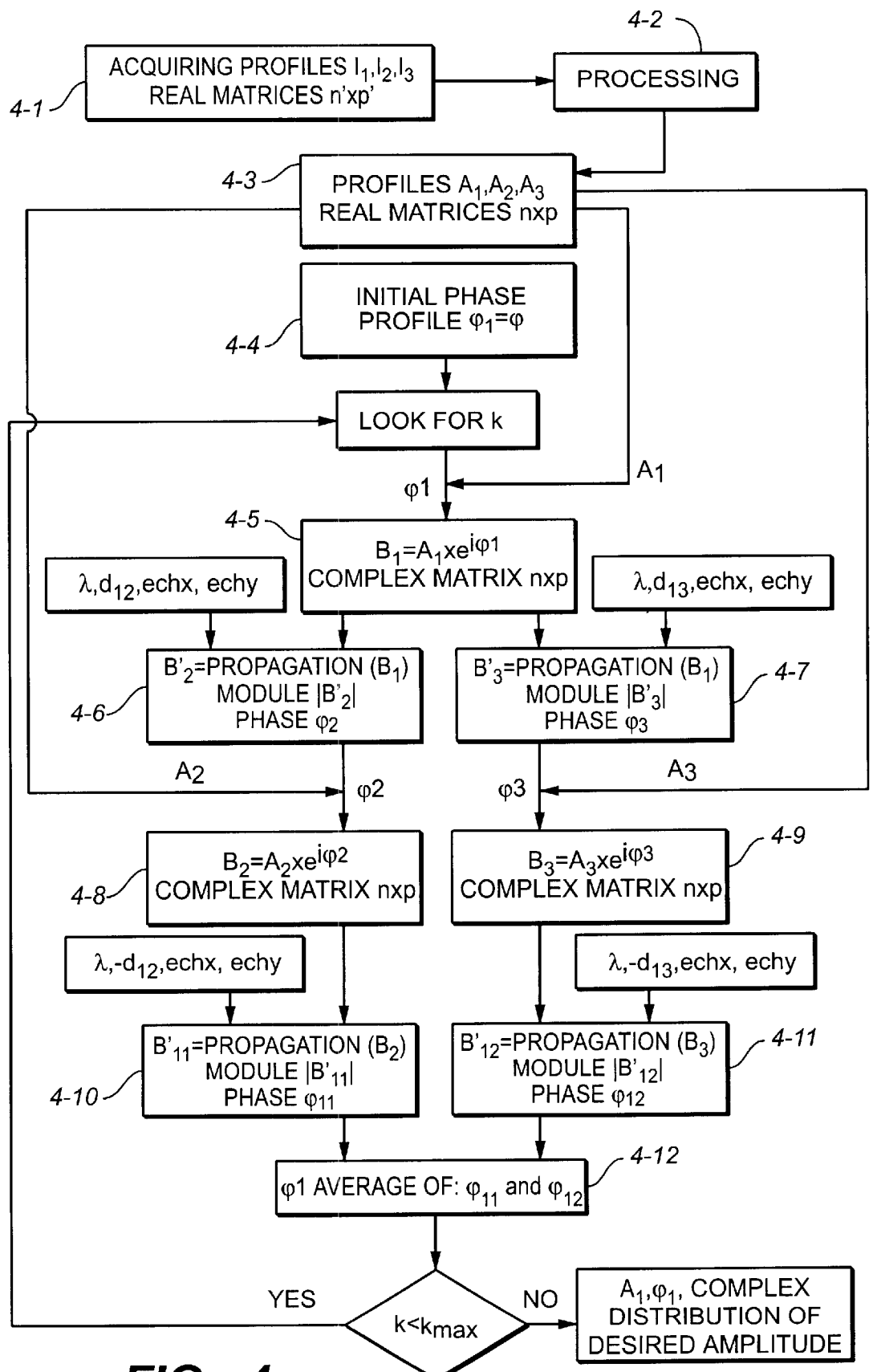
FIG._4

METHOD AND DEVICE FOR DETERMINING THE DISTRIBUTION OF INTENSITY AND PHASE IN A LASER BEAM DIFFERENT CUTTING PLANES

This application is a national phase of PCT/FR99/00307 which was filed on Feb. 11, 1999, and was not published in English.

TECHNICAL FIELD AND PRIOR ART

The invention relates to a method and device for determining the intensity and/or phase distribution in various cut planes of a space coherent beam, in particular of the light beam produced by a laser.

To carry out such a determination, known devices are split into three categories:

1) interferometry devices,
2) devices of Hartmann-Shack type
3) space pattern sampling devices.

Interferometry devices and methods use the combination of the wave front to be measured with a wave having a phase relation therewith.

Devices and methods of the Hartmann-Shack type use a phase mask (lens arrays, holes . . . ) to evaluate the slope of the wave surface at each point. Reconstruction then allows the wave surface to be calculated.

The problem of obtaining the phase from mere intensity profiles has already been studied in literature as the so-called "phase retrieval problem". The study of various existing solutions is proposed in the articles "Phase retrieval algorithms: a comparison", Applied Optics, vol. 21, p. 2758, August 1982, and "The phase retrieval problem", IEEE Transactions on Antennas and Propagation AP29, P. 386, March 1981.

In particular, the algorithm proposed by Gerchberg and Saxton in 1971 (magazine Optik 34, 275 (1971)) is known. The authors use an image plane, and a distant field diffraction plane, at the focus of a lens.

According to this algorithm, an intensity profile is measured in a first cut plane, by assigning a phase profile that is arbitrary in every point of this plane; next, using beam propagation equations, the intensity and phase profile in a second cut plane is calculated: the intensity profile calculated in this second plane is replaced by the measured profile, and the intensity and phase profiles are again calculated in the first plane. Iteration is performed up to convergence.

According to the article by D. L. Misell ("A method for the solution of the phase problem in electron microscopy") published in J. Phys. D. Appl. Phys., vol. 6, 1973, p. L6–L9 and the comments on this article by Gerchberg and Saxton (same references, p. L31), both planes can be any planes but close to each other.

In recent literature, numerous studies have been conducted on these methods, applied to electronic microscopy and antenna transmission. These studies suggest algorithmic improvements. E.g., we may quote the article "Radiation Pattern Evaluation from near-field Intensities on planes", IEEE Transactions on Antennas and Propagation, vol. 44, no. 5, May 1996, which suggests not to use necessarily the object plane and the Fourier plane.

Tests performed with laser beam images and these methods have not allowed to reach results sufficiently good to make it possible to do without systems of the Hartmann-Shack type.

The problem is therefore posed of finding a method and device allowing to improve the accuracy of phase reconstruction, and compete with expensive commercially available systems, e.g. of Hartmann-Shack or Zygo type.

DESCRIPTION OF THE INVENTION

First of all, the object of the invention is an iterative method of determining the intensity and phase distribution of a light beam coherent in one plane, comprising the steps of:

measuring the intensity $I_i$, i=1 . . . N, of the beam, in N planes, $N \geq 3$, including the plane wherein intensity and phase distribution is to be determined, choosing, for plane i=1, an initial phase matrix $\phi_1$ and calculating a complex amplitude matrix, by term-wise multiplying the phase matrix $e^{i\phi_1}$ by the corresponding amplitude matrix $A_1$, for each plane j>1:

determining a propagated complex matrix $B'_j$ from the measured amplitude matrix $I_{j-1}$ of plane j−1 and the phase matrix $\phi$ of plane j−1, extracting, from $B'_j$, the phase matrix of plane j, iterating the method up to convergence (and j=1 when j−1=N).

The method according to the invention therefore implements N planes, with $N \geq 3$. One of these planes is that of which intensity and phase distribution is to be determined. The method starts with a phase profile (e.g., null) on a first plane. Then, by calculation, the beam propagation from one plane to another are performed while keeping, after each iteration, the phase profile calculated for a plane, and by introducing the intensity profile measured in the same cut plane. Thus, we proceed from plane #1 to plane #2, . . . to plane #N, then we return to plane #1. The convergence of the phase profile towards the intended profile is noted: indeed, the intensity and phase profiles calculated in one of the N planes allow the intensity profiles measured in any other plane to be retrieved exactly.

For each plane j(j>1), a phase profile is calculated from the complex matrix reflecting the state of the beam in this plane. This complex matrix is itself the result of a calculation, which reflects the equations of propagation, implementing the (measured) intensity matrix and the (calculated) phase matrix in plane j−1. In other words, for each plane j, by propagation, the intensity and phase profile in this plane is calculated, then the intensity profile calculated in this plane is replaced by the measured intensity profile. It is then possible, from this measured intensity profile and the calculated phase profile, to perform a propagation calculation for plane j+1.

It is possible to use any path among the N planes, as required.

Consequently, according to the invention, instead of moving to and fro among two cut planes, at least three cut planes are implemented and we proceed for instance from the first plane to the second one, then to the third one, . . . then to the Nth one, and we return to the first plane, and so on. The accuracy of the phase reconstruction on the intermediate planes is thus improved significantly, which allows to compete with expensive commercially available systems, e.g. of Hartmann-Shack or Zygo type.

According to a development, the phase taken into consideration in the first cut plane at each iteration is an average of the phase profiles determined from all the plane pairs in one round trip. This method allows to introduce a weighting factor into averaging, wherein this factor can depend on a merit function of the current calculation. Thus, convergence on the N profiles is optimized.

Two versions of the method according to the invention are therefore proposed according to the calculation path among the measuring planes. The first methods covers the planes sequentially, whereas the second one performs a round-trip among plane pairs, and allows the relative weight of the different measured planes to be weighted.

The invention also relates to a device for implementing the invention.

Thus, the invention relates to a device, for determining the intensity and phase of a light beam in a plane, comprising:
a means for measuring intensity $I_i$ (i=1, . . . N) of the beam in N planes, N≧3,
based on an initial phase matrix $\phi_1$ corresponding to a plane i=1, a calculation means programmed for:
calculating a complex amplitude matrix ($B_1$) by multiplying the phase matrix $e^{i\phi_1}$ by the corresponding amplitude matrix ($A_1$),
for each plane j>1:
calculating a propagated complex matrix $B'_j$ from the measured amplitude matrix $A_{j-1}$ of plane j−1 and the phase matrix $\phi$ of plane j−1,
extracting a phase matrix from plane j of matrix $B'_j$, iterating the above calculation by making j=1 when j−1=N.

This device uses as many cameras as there are cut planes; preferably, the measured images are digitized before being processed. It can include a system for shaping the beam, limiting the extend thereof so as to adapt it to the cameras and to the bank length; a calibration step is then integrated in the steps of the main method. The addition of a lens or any other phase object allowing the beam to be adapted to the measuring device (divergence control . . . ) makes it possible to increase the field of application of the device. Using calculations, the calibration step then allows to do without the presence of the added component and thus to gain access to beam characteristics.

A phase analyzer using a method according to the invention allows to obtain the complex amplitude distribution of the field, representing both beam intensity and phase in a given plane (generally an image plane). This measurement then allows the beam progress in other planes to be calculated directly and reliably.

BRIEF DESCRIPTION OF THE FIGURES

Anyway, the features and advantages of the invention will be more apparent from reading the following description. This description concerns sample embodiments provided by way of example and not to be restrictive, with reference to the appended drawings where:

FIG. 1 represents a device for implementing the invention.

FIG. 2 represents steps of intensity matrix preprocessing.

FIG. 3 represents the steps of a first embodiment of a method according to the invention.

FIG. 4 represents the steps of a second embodiment of a method according to the invention.

FIG. 5 schematically represents so-called propagation processing.

DETAILED DESCRIPTION OF THE EMBODIMENTS OF THE INVENTION

Firstly, the invention will be described using the schematic embodiment of FIG. 3. An implementation device is schematically represented in FIG. 1.

The invention allows to calculate the complex field of a laser beam 4 in the starting pupil conventionally defined by plane $P'_1$ represented in FIG. 1 based on intensity measurements performed in N planes $P_1$, $P_2$, $P_3$ (N>3) ($P_i$ and $P'_i$ being optically conjugate)

We are going to describe the case where N=3.

Let $A_i e^{i\phi_i}$ be the complex amplitude in plane i, 1≦i≦N.

The intensity $I_i=|A_i|^2$ is measured in plane i, using CCD cameras 1, 2, 3.

The cameras are connected to a calculator 6. The calculation process and method are implemented by programming this calculator. The appropriate programming instructions are stored on magnetic discs or in conventional RAM or ROM memories.

For each of the measuring planes $P_i$, the measure $I_i$ is supplied to a calculator memory 6.

The following is also stored:
the value of the wave length of the analyzed beam, designated as $\lambda$,
the measuring scales expressed in m/pixel (distance between two successive points of each matrix, after interpolation), designated as echx and echy,
the relative distances between the N measuring planes: $d(P_i,P_j)=d_{i,j}$.

From the intensity measurements $I_i$, the method according to the invention allows the phase $\phi_1$ to be retrieved in plane number 1. It will then be possible to calculate the phase $\phi$ of the beam in any plane.

After digitization, the measurement of $I_i$ supplied by each camera appears in the form of a matrix $I_i(n',p')$, including n' lines and p' columns of real numbers.

Each matrix is resampled at n×p where n and p are powers of 2, close to n' and p', so that fast Fourier transforms can be used.

Processing is performed previously on the matrices to as to get rid of certain measurement-related problems: this processing is schematically represented in FIG. 2.

An interpolation step (step 2-2) allows to proceed from a profile with n'×p' points to a profile having n×p points, with n and p being the powers of 2 closest to n' and p'. Thus, n and p are defined, then the data is interpolated to obtain the matrix I', corresponding to I (step 2-3).

The profile is centered in the window so that the center of gravity of the intensity distribution thus considered is in the middle of the matrix (step 2-4).

For the calculations, the amplitude of the measuring planes will be used. So, the intensity matrix root will be taken term-wise (step 2-5) to finally obtain Ax (step 2-6).

Then, a profile standardization is performed to ensure conservation of energy. For this purpose, the matrix A' is divided by the root of the sum of the Each matrix is resampled at n×p where n and p are squares of these terms (step 2-7) to obtain the desired amplitude A (step 2-8).

FIG. 3 then gives the main calculation steps according to the invention, for three measuring planes.

Acquisition of the three intensities $I_1$, $I_2$, $I_3$ is performed (step 3-1). Then, these three digitized images are processed as described above with reference to FIG. 2 (step 3-2) n×p dimensional amplitudes $A_1$, $A_2$, and $A_3$ are obtained (step 3-3).

An initial n×p dimensional phase matrix $e^{i\phi_1}$ (e.g. with $\phi_1=0$) is chosen (step 3-4), which is multiplied by $A_1$ (step 3-5) to obtain the nxp complex matrix $B_1$:

$$B_1 = A_1 e^{i\phi_1}$$

Further details on this multiplication will be given below.

Then, a so-called "propagation" process (step 3-6) is applied to this matrix $B_1$, which will be described below, and which allows to obtain a matrix $B'_2$ from matrix $B_1$, the propagation distance being the distance $d_{12}$ between planes i=1 and i=2.

The phase information $\phi_2$ contained in $B'_2$ is retrieved (as described below). This information is multiplied by amplitude $A_2$ (step 3-7). Then, the matrix $B_2$ is obtained, to which propagation over a distance $d_{23}$ (distance between planes i=2 and i=3) is applied. Matrix $B'_3$ is obtained (step 3-8).

Also, $\phi_3$ is extracted from $B'_3$ and $B_3$ is calculated, the product of $\phi_3$ and $A_3$ (step 3-5). By applying the propagation function to $B_3$ over a distance $-d_{13}$ (to return to plane 1), the reconstructed profile $B'_1$ is found (step 3-10) containing a new term $\phi_1$, which is used for the following loop (with k=k+1).

It is also possible to propagate $B_3$ to a fourth plane if a number of planes greater than 3 has been chosen.

Processing stops, e.g. when k reaches a limiting value $k_{max}$, or when the result is considered satisfactory. The calculated value of $B_1$ then corresponds to the complex amplitude profile in the first plane (i=1).

An improved variant of this process, the so-called "weighted" variant, is schematically represented in FIG. 4.

Acquisition of three intensities $I_1$, $I_2$, $I_3$ is performed (step 4-1). Then, these three digitized images are processed as described above (step 4-2). Thus, the real nxp dimensional matrices with amplitude $A_1$, $A_2$, $A_3$ are obtained (step 4-3).

An initial nxp dimensional phase matrix $e^{i\phi 1}$ is chosen (step 4-4, e.g. with ($\phi_1$=0)

$e^{i\phi 1}$ is multiplied by $A_1$ to obtain the complex matrix $B_1$ (step 4-5):

$$B_1=A_1e^{i\phi 1}$$

Again, further details on this multiplication will be given below.

To this matrix, the propagation function associated with distances $d_{12}$ and $d_{13}$ is applied to obtain the matrices $B'_2$ and $B'_3$ (steps 4-6 and 4-7).

These matrices contain information of phase $\phi_2$ in plane i=2, and phase $\phi_3$ in plane i=3. $\phi_2$ and $A_2$ are multiplied to obtain $B_2$ (step 4-8), $\phi_3$ and $A_3$ to obtain $B_3$ (step 4-9). Then to each of matrices $B_2$ and $B_3$, propagation processing is applied, respectively with a distance $-d_{12}$ and $-d_{13}$ (steps 4-10 and 4-11).

From the two matrices $B'_{11}$ and $B'_{12}$ thus obtained, the two phases $\phi_{11}$ and $\phi_{12}$ are extracted. Another term $\phi_1$ is obtained (step 4-12) by performing a weighted average of these two phases (the type of weighting is defined as required). This term is used for the following loop with k=k+1.

It is also possible to use a greater number N of planes (N>3), the weighted average at the beginning of loop k+1 then applying to the N−1 phases determined during loop k. It is also possible to average N−p phases, with p>1, but this is similar to ignoring p−1 planes, or weighting p−1 plane by 0: this is then as if the measurements had been taken on N−(p−1) planes.

Processing stops when k reaches a limiting value $k_{max}$ or when the result is considered satisfactory. Phase $\phi_1$ thus found, combined with amplitude $A_1$, gives the complex amplitude of the first plane.

The propagation process, corresponding to steps 3-6, 3-8, 3-10, and 4-6, 4-7, 4-10, and 4-11 of FIGS. 3 and 4, is illustrated in FIG. 5. From an initial nxp dimensional matrix B(x,y), a "propagated matrix" $B_p$ ($x_p,y_p$), also nxp dimensional, is calculated.

The complex matrix B describes beam amplitude and phase in a certain plane. The complex matrix $B_p$ describes beam amplitude and phase in another plane. It is possible to proceed from B to $B_p$, i.e. from one plane to another, using the beam propagation equations.

It is possible for instance to proceed from B(x,y) to $B_p(x_p,y_p)$ by convoluting B with the propagation matrix in the vacuum of the Fourier optics.

A first so-called "zero-padding" step 5-1 consists in centering the nxp dimensional matrix B in a 2nx2p matrix, exclusively composed of zeros, in order to make a linear convolution.

Thereby, a 2nx2p sized matrix B(x,y) is obtained.

Through a fast Fourier transform (step 5-2), a 2nx2p dimensional matrix B' ($\mu,v$) is obtained. Multiplication by a factor of $e^{j\pi\lambda d(\mu^2,v^2)}$ (step 5-3) allows a 2nx2p dimensional matrix $B'_p(\mu_p,v_p)$ to be obtained. Through an inverse Fourier transform (step 5-4), a 2nx2p dimensional propagated matrix $B_p(X_p,y_p)$ is obtained.

Extraction (step 5-5) is the inverse step consisting in removing the peripheral terms (most often null) of matrix $B_p$ so as to return to the initial dimension.

FFT is the algorithm of the fast Fourier transform existing in most function libraries.

Any other propagation algorithm can be used successfully.

Regarding phase processing and multiplication, it will be noted firstly that all of the propagation calculations are performed with complex amplitude matrices grouping amplitude and phase.

It is phase information that is kept at each step when the acquired amplitude profiles are resumed.

When a matrix B of complex amplitude (B=|B|.$e^{i\phi}$) is handled, the phase $\phi$ is to be extracted. There are two possibilities for phase handling:

according to a first possibility, calculating phase $\phi$ can be done by calculating the complex amplitude argument. When the multiplication of the phase by a stored profile $A_i$ is handled, the matrix $A_i$ is multiplied term-wise by the matrix of $e^{i\phi}$. Thus, another complex amplitude B is obtained;

according to a second possibility for relieving the calculation load, it is possible to calculate phase $\phi$ of a matrix B only if the expression thereof at the end of reconstruction is desired. For intermediate calculations, matrix $e^{i\phi}$ is used directly. This term is obtained directly by dividing the complex matrix B term-wise by its module matrix |B| f it is then desired to multiply the stored amplitude by the phase, matrix A is multiplied term-wise by the matrix $e^{i\phi}$ thus calculated.

The method according to the invention, thanks to a number of reference planes greater than or equal to 3, more or less allows to "impose" the calculated profile in each of the measuring planes. The result is an initial intensity/phase profile much more stable and closer to measured reality. It appeared that the measured profiles perfectly matched the profiles calculated from the original plane. This proves the truthfulness of the reconstituted phase profile. This match is significantly better than what can be expected to be obtained with a Hartmann-Shack or Zygo type analyzer, and moreover at lower cost.

What is claimed is:

1. An iterative method of determining the intensity and phase distribution of a coherent light beam (4), in a plane, comprising the steps of:

measuring the intensity Ii, i=1 . . . N, of the beam, in N planes, N≧3, including the plane wherein intensity and phase distribution is to be determined, choosing, for plane i=1, an initial phase matrix $\phi_1$ and calculating a complex amplitude matrix, by term-wise multiplying the phase matrix $e^{i\phi_1}$ by the corresponding amplitude matrix $A_1$, for each plane j>1:

determining a propagated complex matrix $B'_j$ from the measured amplitude matrix $A_{j-1}$ of plane j−1 and the phase matrix $\phi$ of plane j−1, extracting, from $B'_j$, a phase matrix of plane j, iterating the method up to convergence, with j=1 when j−1=N.

2. The method according the claim 1, each intensity matrix $A_i$ including n lines and p columns, n and p being powers of 2.

3. The method according to claim 2, the phase taken into account in plane j=1 at each iteration being a weighted average among the N−1 phase profiles determined earlier.

4. The method according to claim 1, the phase taken into account in plane j=1 at each iteration being a weighted average among the N−1 phase profiles determined earlier.

5. The method according to claim 1, the propagated complex matrix $B'_j$ being obtained by:

calculating the product of the measured matrix with amplitude $A_{j-1}$ of plane j−1 and the phase matrix $e^{i\phi}$ of plane j−1, convoluting this product with the propagation matrix in the vacuum of the Fourier optics.

6. The method according to claim 1, the phase matrix $\phi$ of plane j−1 being obtained by calculating the argument of the propagated complex matrix $B'_{j-1}$ associate with plane j−1.

7. The method according to claim 1, the phase matrix $\phi$ of plane j−1 being obtained by term-wise dividing the propagated complex matrix $B'_{j-1}$ by its module matrix $|B'_{j-1}|$.

8. The method according to claim 1, the beam being previously shaped by means limiting the extend thereof, and the method further comprising a calibration step.

9. A device for determining the intensity and phase of a light beam (4) in a plane comprising:

a means (1, 2, 3) for measuring the intensity $A_i$ (i=1, ... N) of the beam in N planes, N≧3, a calculation means (6) programmed to perform the following steps, from an initial phase matrix $\phi_1$, corresponding to a plane i=1:

calculating a complex amplitude matrix ($B_1$) by multiplying the phase matrix $e^{i\phi_1}$ by the corresponding intensity matrix ($A_1$), for each plane j>1:

calculating a propagated complex matrix $B'_j$ from the measured amplitude matrix $A_{j-1}$ and the phase matrix $\phi$ of plane j−1, extracting a phase matrix of plane j, from matrix $B'_j$ iterating the above calculation, making j=1 when j−1=N.

10. The method according to claim 9, the calculation means (6) being further programmed for converting the intensity matrix measured into a matrix of n lines and p columns, n and p being powers of 2.

11. The device according to claim 10, the calculation means (6) being further programmed for producing, at the end of each iteration, a weighted average of the N−1 phase profiles determined during this iteration.

12. The device according to claim 9, the calculation means (6) being further programmed for producing, at the end of each iteration, a weighted average of the N−1 phase profiles determined during this iteration.

13. the device according to claim 9, the calculation means (6) being programmed for calculating a propagated complex matrix B'j:

by multiplying the measured matrix by intensity $A_{j-1}$ of plane j−1 and the phase matrix $e^{i\phi}$ of plane j−1, then convoluting this product with the propagation matrix in the vacuum of the Fourier optics.

14. The device according to claim 9, the calculation means (6) being programmed for producing the phase matrix $\phi$ of plane j−1 by calculating the argument of the complex matrix $B'_{j-1}$ associated with plane j−1.

15. The device according to claim 9, the calculation means (6) being programmed for producing the phase matrix $\phi$ of plane j−1 by term-wise dividing the propagated complex matrix $B'_{j-1}$ by its module matrix $|B'_{j-1}|$.

16. The device according to claim 9, further comprising means for shaping the beam and limiting the extent thereof so as to adapt it to the cameras, the calculation means (6) being further programmed for the calculation to be independent of the presence of said beam shaping means.

* * * * *